US009999271B2

(12) United States Patent
Reda

(10) Patent No.: US 9,999,271 B2
(45) Date of Patent: Jun. 19, 2018

(54) HELMET LOCK

(71) Applicant: Ronald F. Reda, Orland Park, IL (US)

(72) Inventor: Ronald F. Reda, Orland Park, IL (US)

(*) Notice: Subject to any disclaimer, the term of this patent is extended or adjusted under 35 U.S.C. 154(b) by 0 days. days.

(21) Appl. No.: 15/627,356

(22) Filed: Jun. 19, 2017

(65) Prior Publication Data

US 2017/0280808 A1 Oct. 5, 2017

Related U.S. Application Data

(63) Continuation-in-part of application No. 15/221,194, filed on Jul. 27, 2016, now abandoned.

(60) Provisional application No. 62/282,178, filed on Jul. 28, 2015.

(51) Int. Cl.
| A42B 3/04 | (2006.01) |
| B62J 11/00 | (2006.01) |
| E05B 73/00 | (2006.01) |

(52) U.S. Cl.
CPC ........... *A42B 3/0413* (2013.01); *B62J 11/005* (2013.01); *E05B 73/0005* (2013.01); *A42B 3/04* (2013.01); *E05B 73/00* (2013.01)

(58) Field of Classification Search
CPC ..... B62J 11/005; Y10T 70/5013; E05B 73/00; E05B 67/003; E05B 71/00; E05B 73/0005; A42B 3/0413
USPC .............................. 70/14, 57, 58, 59, 30, 49
See application file for complete search history.

(56) References Cited

U.S. PATENT DOCUMENTS

| 3,101,695 | A | * | 8/1963 | Honeyman, Jr. | ....... B63B 21/54 114/230.29 |
| 3,797,283 | A | * | 3/1974 | Honer | ...................... B60D 1/60 52/143 |
| 3,798,934 | A | * | 3/1974 | Wright | ................. A42B 3/0413 119/795 |
| 3,800,575 | A | * | 4/1974 | Perret, III | ................ B62H 5/04 411/19 |
| 4,212,175 | A | * | 7/1980 | Zakow | ................ E05B 73/0005 70/58 |
| 4,570,465 | A | * | 2/1986 | Bennett | ............... E05B 73/0005 70/18 |
| 4,598,827 | A | * | 7/1986 | Keifer | ................... E05B 69/006 211/4 |
| 4,676,080 | A | * | 6/1987 | Schwarz | ............. E05B 73/0005 70/49 |
| 5,501,494 | A | * | 3/1996 | Willetts | ................ E05C 19/182 292/262 |
| 5,794,871 | A | | 4/1998 | Willets | |
| 6,872,039 | B2 | | 3/2005 | Baus | |

(Continued)

*Primary Examiner* — Suzanne L Barrett
(74) *Attorney, Agent, or Firm* — Ingenium Patents LLC; Peter R. Kramer

(57) ABSTRACT

A helmet locking system utilizing an arrangement of two enlarged members, a pass-through locking member, and a length of cable. A fixed enlarged member is permanently mounted to the cable and a detachable enlarged member engages with the pass-through locking member which is positioned on the cable's end opposite to the fixed enlarged member. The locking system does not require keys or a combination. Pass-through locking member is threaded through the D-ring of a helmet. Detachable enlarged member is then fixedly fitted onto the pass-through locking member. The detachable enlarged member is then placed into a motorcycle's storage compartment which is then closed and locked thereby securing the helmet to the motorcycle.

4 Claims, 3 Drawing Sheets

(56) References Cited

U.S. PATENT DOCUMENTS

Figure 1:
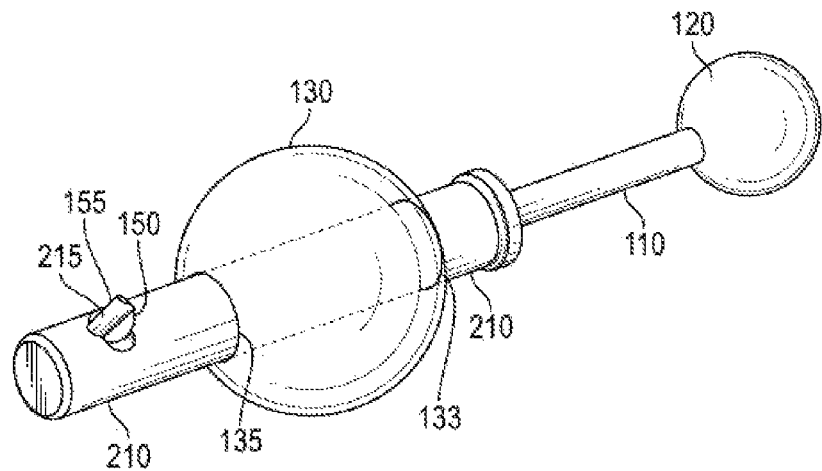

| | | | | |
|---|---|---|---|---|
| 7,724,520 B2* | 5/2010 | Allen | ............... | E05B 73/0082 |
| | | | | 211/8 |
| 9,433,312 B2* | 9/2016 | Cooper | ............... | A47G 25/48 |
| 2006/0112745 A1* | 6/2006 | Collier | ............... | B62H 5/001 |
| | | | | 70/233 |
| 2014/0238091 A1* | 8/2014 | Allen | ............... | E05B 73/0082 |
| | | | | 70/58 |
| 2016/0135534 A1* | 5/2016 | Hwang | ............... | A42B 3/283 |
| | | | | 2/422 |

* cited by examiner

HELMET LOCK

CROSS-REFERENCE TO RELATED APPLICATIONS

This application is a Continuation-In-Part of Nonprovisional patent application Ser. No. 15/221,194 filed Jul. 27, 2016 and claims priority benefit of U.S. Nonprovisional application Ser. No. 15/221,194 filed Jul. 27, 2016 and Provisional Application No. 62/282,178 filed on Jul. 28, 2015. Application Ser. No. 15/221,194 claims benefit of Application 62/282,178. The contents of application Ser. No. 15/221,194 are expressly incorporated herein by reference.

BACKGROUND OF THE INVENTION

Field of the Invention

The inventive subject matter pertains to securement devices for motorcycle safety helmets.

Description of Related Art Including Information Disclosed Under 37 CFR 1.97 and 1.98

Wright U.S. Pat. No. 3,798,934 discloses a helmet and lock structure. A cable with key and padlock are elements of the apparatus. Schwarz, U.S. Pat. No. 4,676,080, discloses an accessory for securing a motorcycle or bicycle helmet which can be used with either a cable and padlock or a U-shaped bicycle lock. These devices require effort to either keep a key dedicated to locking the helmet or taking the time to operate a combination lock.

BRIEF SUMMARY OF THE INVENTION

Safety helmets are used by most motorcyclists to prevent injury and in many states helmet use is mandated by statute. Because good quality protective helmets can be costly theft is often a problem when helmets are left unsecured and unattended in publicly accessible spaces but because helmets are bulky and unwieldly to carry it is not desirable to carry the helmet after reaching a destination. Currently in order to lock a helmet to a motorcycle a lock with a key or a combination lock is required. In some cases a cable or chain is necessary to secure a helmet against theft. Helmet securement devices need to attach to a part of the motorcycle in order to secure a helmet. These securement devices are cumbersome and take up storage space which can be quite limited. Other more expensive devices hard mount to a motorcycle frame or handlebars. These devices all require keys or combinations and are permanently mounted with bolts and screws and therefore not conveniently removable. Helmet securement devices need to attach to a part of the motorcycle in order to secure a helmet. These securement devices are cumbersome and take up scarce storage space.

The present invention is a device comprised of a cable or bar with a pass-through locking member attached to its first end, and with a fixed enlarged member permanently attached at its second end. A detachable enlarged member can be reversibly mounted to the pass-through locking member at the first end of the cable. The detachable enlarged member is configured to engage a latching mechanism having a spring loaded detent, the latching mechanism being located on the pass-through locking member.

The free first end of the cable, sans detachable enlarged member, can be passed through a D-ring chin strap fastener of the helmet. The detachable enlarged member is then securely affixed to the pass-through locking member at the first end of the cable. By placing the detachable enlarged member into a locked storage compartment of the motorcycle, the helmet, which is external to the storage compartment, is thereby secured.

BRIEF DESCRIPTION OF THE SEVERAL VIEWS OF THE DRAWING(S)

Figure 2:
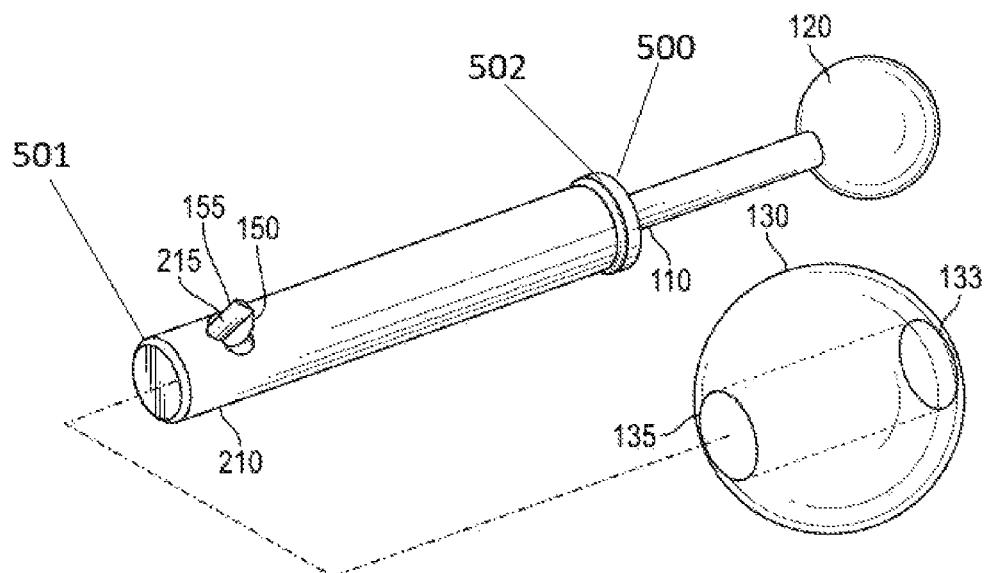
Figure 3A:
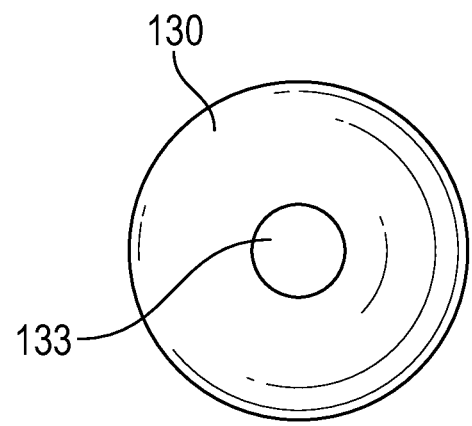
Figure 3B:
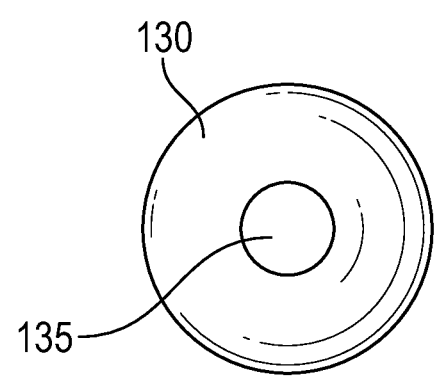
Figure 4:
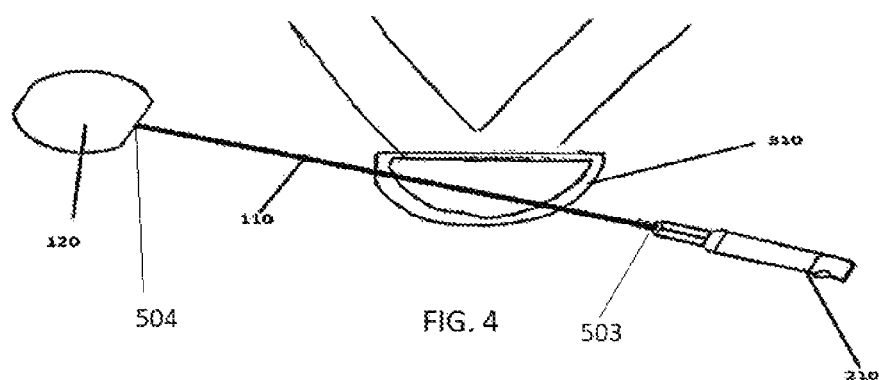
Figure 5:
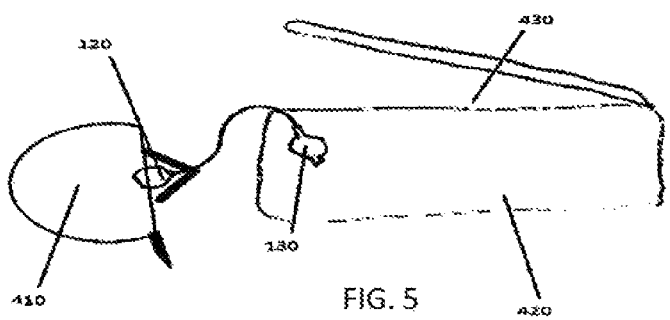

FIG. 1 Perspective view of an embodiment with detachable enlarged member attached FIG. 2 Perspective view of an embodiment with detachable enlarged member detached FIG. 3A Perspective view of detachable enlarged member of an embodiment of the invention showing an entry port FIG. 3B Perspective view of detachable enlarged member of an embodiment of the invention showing an exit port FIG. 4 Perspective view showing cable being threaded through the D-ring of a helmet FIG. 5 Perspective view of an embodiment of the present invention in use securing a helmet

DETAILED DESCRIPTION OF THE INVENTION

FIG. 1 shows an embodiment of the invention with detachable enlarged member 130 locked in place at the first end 503 of cable 110. The first end 503 of the cable is shown in FIG. 4. A pass-through locking member 210 is attached to the cable at the first end of the cable, the pass-through locking member has a spring-loaded detent 215 which engages detachable enlarged member 130. The detent is configured so that it cannot be detached from the pass-through locking member. The pass-through locking member 210 engages detachable enlarged member 130 by passing its distal end 501 through a cylindrical space within detachable enlarged member 130. A flange 502 is positioned at the proximal end 500 of the pass-through locking member thereby preventing the flanged end from entering the cylindrical space. An abutment 150 engages the exit port 135 thereby preventing detachment of the detachable enlarged member while the helmet lock is in use and locks the detachable enlarged member 130 to the cable. When angled surface 155 of detent 215 strikes the edge of entry port 133, detent 215 is urged downward into the interior of locking member 210 thereby facilitating attachment of detachable enlarged member 130.

FIG. 2 shows detachable enlarged member 130 separated from the rest of the device. When detent 215 is depressed detachable enlarged member 130 can be disengaged from the locking member. FIGS. 3A and 3B show views of entry port 133 and exit port 135 on detachable enlarged member 130. FIGS. 1 and 2 show a preferred embodiment which uses the self-locking pin described in U.S. Pat. No. 6,872,039 issued to Baus & Swenson as the pass-through locking member. FIGS. 1 and 2 of U.S. Pat. No. 6,872,039 are incorporated herein by reference.

FIGS. 4 and 5 illustrate operation and use of the helmet lock. FIG. 4 shows the helmet lock, with cable inserted through the D-ring 310 of a helmet. The free end of the cable with pass-through locking member, which is disconnected from detachable enlarged member 130, is threaded through the D-ring of the helmet. Pass through locking member 210 is then inserted into entry port 133 and through channel 139 of detachable enlarged member 130 until detent 215 emerges from exit port 135. Spring-loaded detent 215 then pops up thereby locking detachable enlarged member to pass-through locking member 215. Detachable enlarged member 130 is then placed into a lockable compartment 420 of a motorcycle. By locking down the lid 430 on compartment 420, with detachable enlarged member 130 inside the compartment, the helmet is effectively secured to the motorcycle.

The helmet lock may be constructed with a resilient cable made of suitable materials or can be a flat metal bar with analogous fixed and detachable enlarged members. The shape of the enlarged members can have many variations without materially departing from the inventive subject matter.

In another embodiment, the pass-through locking member is comprised of a threaded member permanently positioned at the first end of the cable. The detachable enlarged member is configured with an entry port and a channel extending from the entry port into the interior of the detachable enlarged member. The channel is threaded and configured to engage the pass-through locking member.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

I claim:

1. A helmet locking system comprising,
a fixed enlarged member,
a cable, said cable having a first end and a second end,
said fixed enlarged member permanently attached to said second end of said cable,
a pass-through locking member, said pass-through locking member attached to said cable, wherein said pass-through locking member is permanently fixed at the first end of said cable, said pass-through locking member having a spring-loaded detent, said detent having an angled surface and an abutment,
a detachable enlarged member, said detachable enlarged member having an entry port, said detachable enlarged member having an exit port, said enlarged member having an interior channel connecting said entry port to said exit port, and said detachable enlarged member and said detent are configured wherein said detent is depressed when said pass-through locking member engages the entry port of said detachable enlarged member and wherein said pass-through locking member locks to said detachable enlarged member when said detent has passed through the exit port of said channel, thereby exposing the abutment of said spring-loaded detent.

2. A helmet locking system comprising,
a cable, said cable having a first end and a second end,
a fixed enlarged member, wherein said fixed enlarged member is permanently positioned at said second end of the cable,
a detachable enlarged member, said detachable enlarged member having an entry port, said detachable enlarged member further having a channel extending from said entry port into the interior said detachable enlarged member,
a pass-through locking member, wherein said pass-through locking member is comprised of either a rigid rod or a rigid cylindrical member, wherein said pass-through locking member is permanently fixed to the first end of said cable, said pass-through locking member configured to pass through said entry port and to engage said detachable enlarged member and further to lock said detachable engaged member in place such that said detachable enlarged member cannot be removed from said pass-through locking member by applying a pulling force.

3. The helmet locking system of claim 2 further comprising, wherein said channel completely extends through said detachable enlarged member,
an exit port, said exit port connected to said entry port by said channel,
said pass-through locking member having a flange at a proximal end of said pass-through locking member, said pass-trough locking member having a distal end,
said pass-through locking member having a spring loaded detent, said spring-loaded detent having an angled surface and an abutment, said pass-through locking member further configured wherein said detent is depressed when said angled surface engages the entry port of said detachable enlarged member and wherein said abutment engages said exit port when said distal end and said detent have completely passed through said channel thereby locking said detachable enlarged member to said pass-through locking member.

4. A method of securing a helmet with a keyless helmet locking system mechanism comprising,
threading a pass-through locking member through a D-ring of a helmet, said pass-through locking member having a spring-loaded detent, said pass-through locking member having a distal end and a proximal end, said proximal end of said pass-through locking member being fixedly attached to a first end of a cable wherein said cable is fixedly attached to a fixed enlarged member at a second end of the cable,
threading said distal end of said pass-through locking member into an entry port (133) at an end of a channel in said detachable enlarged member,
locking said detachable enlarged member to said pass through locking member by releasing the spring-loaded detent by passing the detent completely through said channel of said detachable locking member, said detent passing through an exit port (135) located at an end of said channel opposite to the entry port,
securing said helmet by locking said detachable enlarged member into a lockable storage compartment.

\* \* \* \* \*